3,352,874
**N-HYDROXYALKYLPIPERIDYL, N'-CYANO-
ALKYLPIPERIDYL ALKANES**
Francis E. Cislak, William H. Rieger and John H. Chapman, Indianapolis, Ind., assignors to Reilly Tar & Chemical Corporation, Indianapolis, Ind., a corporation of Indiana
No Drawing. Filed June 14, 1965, Ser. No. 463,904
4 Claims. (Cl. 260—294.7)

This invention relates to new compositions of matter. More particularly, it relates to new organic compounds, N-hydroxyalkylpiperidyl, N'-cyanoalkylpiperidyl alkanes, which compounds have the formula:

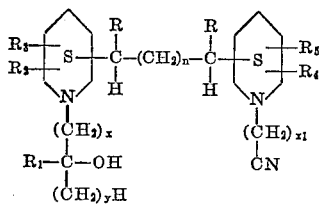

wherein R, $R_1$, $R_2$, $R_3$, $R_4$, and $R_5$ represent hydrogen or lower alkyl, they may be alike or they may be different; $x$ is an integer from 0 to 4; $y$ is an integer from 0 to 2; $x_1$ is an integer from 1 to 3; $n$ is an integer from 0 to 4.

In general, our new compounds may be prepared by the reaction of a halogenoalkyl nitrile with an N-hydroxyalkylpiperidyl, piperidyl alkane in the presence of an alkali metal carbonate. Some of them may be prepared by the interaction of an N-hydroxyalkylpiperidyl, piperidyl alkane with acrylonitrile.

The N-hydroxyalkylpiperidyl, piperidyl alkanes used in the preparation of our new compounds are in themselves new compounds. They are the subject matter of co-pending application Ser. No. 449,284 filed Apr. 19, 1965. In general, they may be prepared by the reaction of a chlorohydrin with an excess of a di-piperidylalkane. Or they may be prepared by the reaction of a chlorohydrin with an excess of a di-pyridylalkane and then catalytically hydrogenating the resulting quaternary pyridinium salt. Some of them may be prepared by reacting an alkylene oxide with an excess of a di-piperidylalkane.

Our N-hydroxyalkylpiperidyl, N'-cyanoalkylpiperidyl alkanes are aliphatic nitriles; they are also aliphatic alcohols. They have the chemical properties associated with aliphatic nitriles and are capable of entering into the same type of chemical reactions as do other aliphatic nitriles, within the limitations imposed by the piperidine nucleus and the alcohol group. They also have the chemical properties associated with aliphatic alcohols and are capable of entering into the same type of chemical reactions as do other aliphatic alcohols, within the limitations imposed by the piperidine nucleus and the aliphatic nitrile group. They are normally solid and possess a low volatility. They are insoluble in water but are soluble in such organic solvents as alcohols, benzene, etc.

Of the many reactions possible with our N-hydroxyalkylpiperidyl, N'-cyanoalkylpiperidyl alkanes, those of most commercial significance are the hydrolysis to the N - hydroxyalkylpiperidyl, N' - carboxyalkylpiperidyl alkanes and the hydrogenation to the N-hydroxyalkylpiperidyl, N'-aminoalkylpiperidyl alkanes; these new compounds are useful in producing polyesters and poly(esteramides). The equation below portrays these reactions with N - hydroxyethyl - 4-piperidyl, N'-cyanoethyl-4-piperidylpropane.

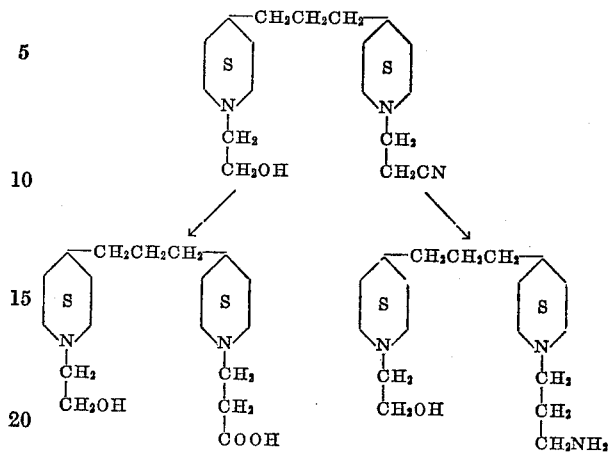

The manner of carrying out our invention is described in the following specific examples. These examples are given by way of illustration only and are not to be construed as a limitation upon our invention.

*Example 1.*—*1-(N-hydroxyethyl-4-piperidyl)-3-
(N-cyanoethyl-4-piperidyl)propane*

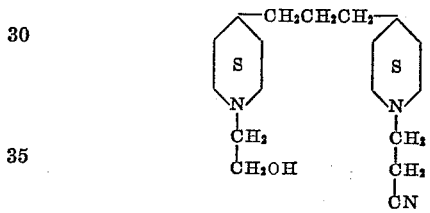

A solution of 127 grams (0.5 mole) of 1-(N-hydroxyethyl-4-piperidyl)-3-(4-piperidyl)propane in 300 ml. of tert.-butyl alcohol is placed into a one liter flask equipped with a stirrer. While stirring the solution there is added 30 grams (0.56 mole) of acrylonitrile. The addition is over a period of one-half hour; the temperature of the reaction solution is maintained at 28–30° C. After all of the acrylonitrile has been added, the solution is stirred for five hours more; the temperature is kept at 28–30° C. When the reaction period is over, the tert.-butyl alcohol is removed by distillation under vacuum. The residue remaining after the alcohol has been distilled off is 1-(N-hydroxyethyl - 4 - piperidyl)-3-(N-cyanoethyl-4-piperidyl) propane.

The 1-(N-hydroxyethyl-4-piperidyl)-3-(N-cyanoethyl-4-piperidyl)propane obtained by the procedure above has a freezing point of 42° C. It is insoluble in water; it is soluble in such common organic solvents as methanol, isopropanol, acetone, benzene, etc.

*Example 2.*—*1-(N-hydroxyethyl-2-piperidyl)-3-
(N-cyanoethyl-2-piperidyl)propane*

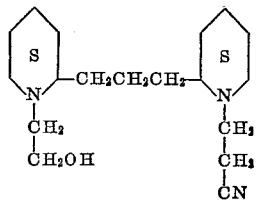

3

The procedure of Example 1 is repeated with the exception that 127 grams of 1-(N-hydroxyethyl-2-piperidyl)-3-(2-piperidyl)propane is used in place of 1-(N-hydroxyethyl-4-piperidyl)-3-(4-piperidyl)propane.

*Example 3.—1-(N-hydroxyethyl-4-piperidyl)-3-(N-cyanopropyl-4-piperidyl)propane*

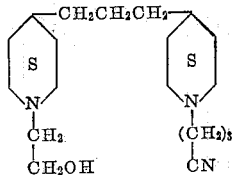

A solution of 127 grams (0.5 mole) of 1-(N-hydroxyethyl-4-piperidyl)-3-(4-piperidyl)propane in 500 ml. of water, 75 grams of 3-bromobutyronitrile, and 150 grams of sodium carbonate is placed into a two-liter flask equipped with a stirrer and a reflux condenser. The solution is stirred and heated at about 70° C. for about four to eight hours. During the heating a reaction occurs whereby sodium bromide and 1-(N-hydroxyethyl-4-piperidyl)-3-(N-cyanopropyl-4-piperidyl)propane are formed. After the reaction period is over, the solution is cooled, and the 1 - (N-hydroxyethyl-4-piperidyl)-3-(N-cyanopropyl-4-piperidyl)propane is separated from the solution by extraction with benzene.

*Example 4.—1-[N-hydroxyethyl-2-(5-ethylpiperidyl)]-3-(N-cyanoethyl-4-piperidyl)propane*

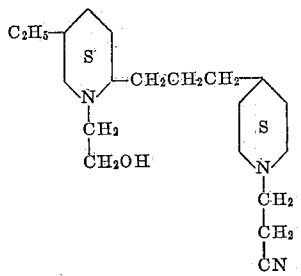

The procedure of Example 1 is repeated with the exception that 141 grams of 1-[N-hydroxyethyl-2-(5-ethylpiperidyl)]-3-(4-piperidyl)propane is used in place of the 127 grams of 1-(N-hydroxyethyl-4-piperidyl)-3-(4-piperidyl)propane.

4

*Example 5.—1-(N-hydroxyethyl-4-piperidyl)-5-(N-cyanoethyl-4-piperidyl)pentane*

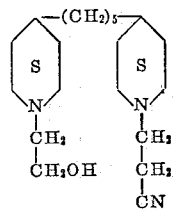

The procedure of Example 1 is repeated with the exception that 141 grams of 1-(N-hydroxyethyl-4-piperidyl)-5-(4-piperidyl)pentane is used in place of the 127 grams of 1 - (N - hydroxyethyl-4-piperidyl)-3-(4-piperidyl) propane.

We claim as our invention:

1. N - hydroxyalkylpiperidyl, N' - cyanoalkylpiperidyl alkanes whose formula is:

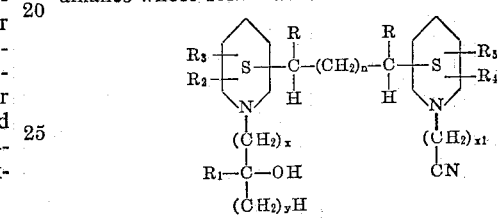

wherein R, $R_1$, $R_2$, $R_3$, $R_4$, and $R_5$ represent a member of the class consisting of hydrogen and lower alkyl; $x$ is an integer from 0 to 4; $y$ is an integer from 0 to 2; $x_1$ is an integer from 1 to 3; $n$ is an integer from 0 to 4.

2. 1 - (N - hydroxyethyl - 4 - piperidyl) - 3 - (N-cyanoethyl-4-piperidyl)propane.

3. 1 - (N - hydroxyethyl - 2 - piperidyl) - 3 - (N-cyanoethyl-2-piperidyl)propane.

4. 1 - [N - hydroxyethyl - 2 - (5 - ethylpiperidyl)] - 3 - (N-cyanoethyl-4-piperidyl)propane.

References Cited

UNITED STATES PATENTS 3,101,340   8/1963   Rorig _____ 260—294.7
3,310,555   3/1967   Pesson _____ 260—294.7

WALTER A. MODANCE, *Primary Examiner.*

A. D. SPEVACK, *Assistant Examiner.*